(12) United States Patent
Collins et al.

(10) Patent No.: US 6,202,267 B1
(45) Date of Patent: Mar. 20, 2001

(54) ORNAMENTAL JEWELRY CATCH

(75) Inventors: Virginia Brownlee Collins, deceased, late of Mableton; by William Claude Collins, executor, Power Springs, both of GA (US)

(73) Assignees: D. Strickland; C. Remeta; G. Addington; J. Edde, all of, GA (US)

( * ) Notice: Subject to any disclaimer, the term of this patent is extended or adjusted under 35 U.S.C. 154(b) by 0 days.

(21) Appl. No.: 09/062,488

(22) Filed: Apr. 17, 1998

(51) Int. Cl.$^7$ .................................................... A44B 13/02
(52) U.S. Cl. ......................................... 24/598.5; 24/599.9
(58) Field of Search ............................. 24/598.2, 598.5, 24/598.6, 599.5, 599.9, 601.5, 598.1; 63/3.1

(56) References Cited

U.S. PATENT DOCUMENTS

| | | | |
|---|---|---|---|
| 2,594,475 | * | 4/1952 | Meyer . |
| 2,637,089 | * | 5/1953 | Kuehn et al. . |
| 2,874,435 | * | 2/1959 | Nielsen ............................. 24/598.5 |
| 4,315,352 | * | 2/1982 | Wagner . |
| 4,411,050 | * | 10/1983 | Couture . |

* cited by examiner

Primary Examiner—James R. Brittain
(74) Attorney, Agent, or Firm—Eric R. Katz

(57) ABSTRACT

An ornamental jewelry catch is disclosed having opened and closed positions for removably connecting ends of a piece of jewelry. The ornamental catch comprises an openable link having a base for attachment to one end of the piece of jewelry, the link including: (1) a first member having a curved receptacle formed at one end thereof and a finger press at another end thereof; (2) a second member having a hook at one end thereof which is received by and releasably held in the curved receptacle of the first member in a snap-fit manner and a finger press at another end thereof; and (3) a hinge pin for pivotally connecting the first and second members at a pivot axis so that the finger presses of the first and second members are juxtaposed to one another at one side of the pivot axis and the curved receptacle and hook of the first and second members are juxtaposed to one another at another side of the pivot axis, the hinge pin positioning a distal end of the hook slightly outside of a front opening of the curved receptacle to create a snap fit having sufficient force to hold the first and second member together in the closed position. Also included is a ring for attachment to the other end of the piece of jewelry, the ring engaging the hook to attach the ends of the piece of jewelry together when the catch is in the closed position. In operation, the catch is opened by pressing the finger presses of the first and second members toward one another so as to snap the hook out the curved receptacle to open the link; and the ornamental jewelry catch attaches the ends of the piece of jewelry by hooking the ring around the hook of the open link and pressing the hook into snap fit engagement with the curved receptacle to close the link.

17 Claims, 3 Drawing Sheets

ORNAMENTAL JEWELRY CATCH

BACKGROUND OF THE INVENTION

1. Field of the Invention

The present invention generally relates to an ornamental catch uniquely suited for use with jewelry such as pearls, and more particularly, to an ornamental jewelry catch for necklaces, bracelets and the like, adapted for reliable, easy and unassisted operation even after extend use or exposure to heat during the soldering process typically employed to attach a catch to a piece of jewelry.

2. Background Discussion

Necklaces and bracelets are popular jewelry items which comprise ornamental bands or chains, or strings of pearls or beads, worn respectively around the neck or wrist of a person. Although some bracelets are formed from various materials into the shape of a continuous band that is slid over a person's hand, most necklaces and bracelets have a releasable catch for connecting the two ends of the piece together to securely retain the jewelry around the person's neck or wrist. Known releasable jewelry catches include the claw catch, the box or barrel catch, the spring catch, as well as the toggle catch.

The typical spring catch configuration generally comprises a first interlocking member and a second releasable operable interlocking member which is spring biased, each of which is respectively attached to one of the opposing ends of the jewelry piece. A specific example of such a spring catch configuration for connecting opposing ends of a necklace or bracelet consists of a small continuous ringlet or loop and a releasably operated, spring biased hook or ring that interlocks with the ringlet to connect the two ends of the piece of jewelry together. A distinctive problem with such spring biased catches is that heat, applied during the soldering process used to attach the catch to the piece of jewelry, causes the inner spring to lose tension, thereby diminishing the operational reliability of the catch and increasing the difficulty of attaching such a spring biased jewelry catch to a piece of jewelry.

Another example of a typical catch configuration generally includes a receiving member having a cavity attached to one end of the jewelry piece and a mating member having a thin insertable projection or tongue which is received by and locked into the cavity. However, the thin tongue can lose tension when heat is applied during the soldering process typically used to attach these catches to jewelry. Tension loss causes the catch not to latch properly when being closed and increases the difficulty of attaching the catch to jewelry.

Other problems with known jewelry catches include the tendency for springs and tongues to wear out with prolonged usage (material from which the catches are made is usually not very strong). Unless the catch is consistently adjusted by a jeweler, this problem can cause the catch to accidentally and unexpectedly come apart thereby resulting in the inadvertent loss of the piece.

Another major problem with known jewelry catches, particularly with a bracelet having a releasable catch, is the effort required for a person to easily and quickly fasten the bracelet around his or her wrist. Manually fastening a bracelet around one's wrist without assistance requires an individual to exhibit great dexterity. First, the hand, adjoining the wrist on which the bracelet is to be worn, is often of no assistance in manipulating the catch. Therefore, a person has only the use of the other hand which must then hold the first interlocking member in place on their wrist while attempting to connect the second, usually releasable interlocking member.

SUMMARY OF THE INVENTION

Accordingly, it is an object of the present invention to provide an ornamental jewelry catch which overcomes the deficiencies of the prior art jewelry catches.

Another object of the present invention is to provide an ornamental jewelry catch which employs a simple mechanism which permits the wearer to snap the catch open and closed without assistance using only one hand and assures safety of closure along with durability of catch.

A further object of the present invention is to provide an ornamental jewelry catch which offers ease of attachment to pearls or jewelry.

Still another object of the present invention is to provide an ornamental jewelry catch which is operationally unaffected by extended use or by the application of heat, such as during a typical soldering operation used to attach the catch to a piece of jewelry.

Yet another object of the present invention is to provide an ornamental jewelry catch which has a motif which is pleasing and particularly adapted for use with pearls.

Advantageous features of the unique and unobvious ornamental jewelry catch of the present invention, as differentiated from the claw catch, the box or barrel catch, the spring catch, toggle catch or other type catches, include the ease with which a jeweler or craftsperson can attach the catch to a piece of jewelry such as a string of pearls or jewelry thereby reducing solder time and the risk of lead poisoning to the jeweler.

Further, the catch of the present invention does not lose tension or break when heated during the soldering process because no springs or tongues are used and catch is made from high density metal components which do not heat up quickly.

Moreover, the catch is durable. Since the catch is preferably made of component parts die casted from metals such as platinum, white gold or yellow gold, the component parts of the catch are made of dense and long-wearing metal. In addition, because the ornamental jewelry catch has no springs or tongues to wear out over time and no screw-type device which can be stripped, there is no need to periodically have the catch adjusted or replaced by a jeweler.

Furthermore, most wearers of pearls or jewelry using the ornamental jewelry catch of the present invention can open and close the catch without assistance, using only one hand, particular when used in combination with a bracelet.

These and other objects and advantageous feature of the ornamental jewelry catch of the present invention are achieved with a simplity of components comprising: a solid receptor shell, a solid catch hook which is received by and held in the receptor shell in a snap-fit manner to form an openable link. A hinge pin pivotally connects the receptor shell to the catch hook at a pivot axis positioned to a base at one side thereof which is provided with a pair of finger presses which are employed to snap open the catch in a simple and easy manner using only one hand. The base is also adapted for attachment to one end of a piece of jewelry. A solid jump ring, adapted for attachment to the other end of piece of jewelry, is provided for engaging the catch hook to connect the ends of the jewelry piece together.

In operation, the catch is snapped opened by pressing the finger presses to open the link. The solid jump ring is hooked around the catch hook and the link is closed by snapping the catch hook into the receptor shell. As a safety feature, the catch hook, around which the solid jump ring is placed, is preferably formed so the hook end is bent back toward itself to prevent snagging as well as to hold the jump ring more securely in place. Thus, the catch of the present invention is closed with one hand by pressing the receptor shell and catch hook together and is be opened with one hand merely by pressing finger presses at the base of the catch.

DETAILED DESCRIPTION OF THE PREFERRED EMBODIMENT(S)

Figure 1A:
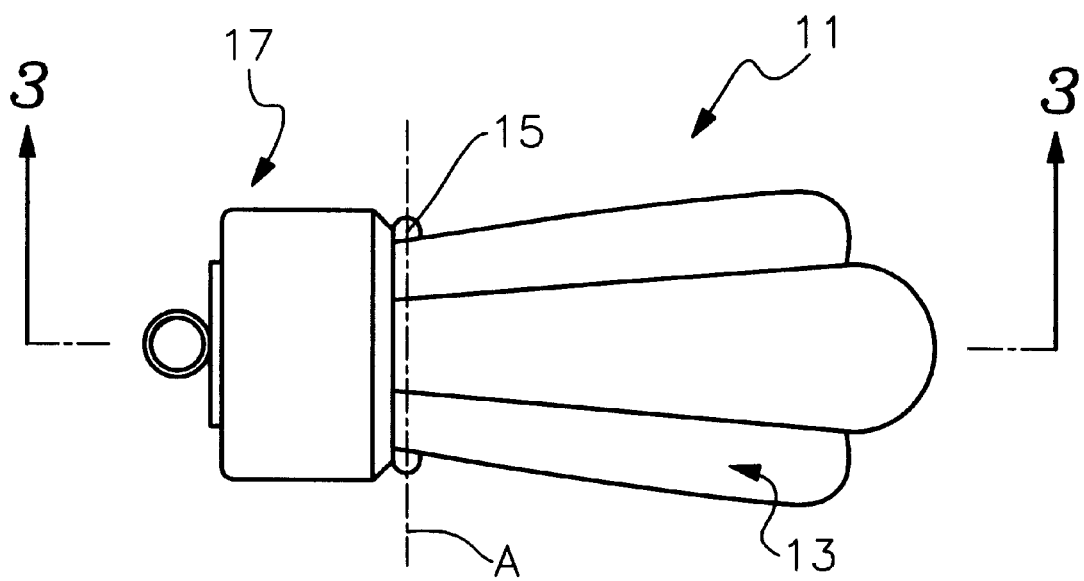
FIGS. 1A and 1B are top and front planar views respectively of one embodiment of the ornamental jewelry catch of the present invention.
Figure 1B:
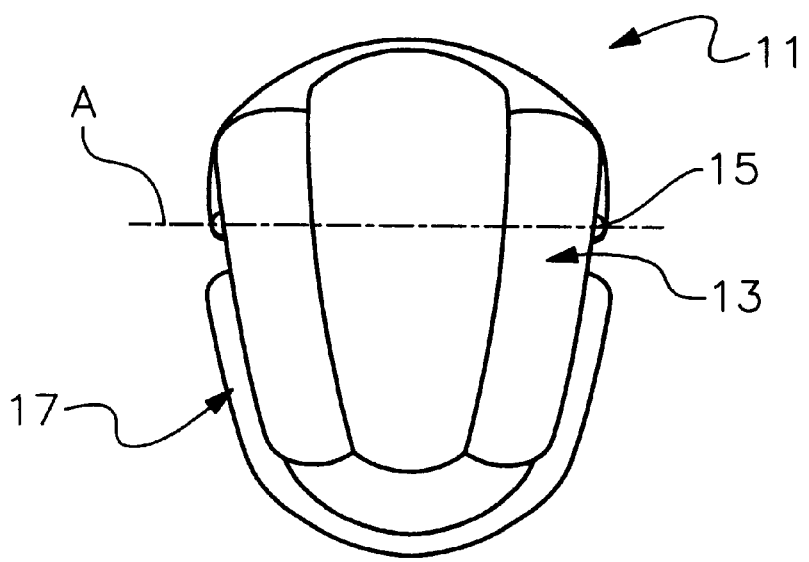

Referring to FIGS. 1A and 1B, one embodiment of an ornamental jewelry catch, generally shown at 11, according to the present invention, is illustrated for holding together the ends for a piece of jewelry (not shown) such as a bracelet, necklace, string of pearls or the like. The catch 11 comprises an openable link, generally indicated at 13, positioned at one side of a pivot axis A formed by a single pinned hinge 15. The openable link 13 is provided with a base, generally indicated at 17, positioned at the other side of the pivot axis A which, as will be more fully described hereinbelow, is used to open the link 13 as well as to attach the link 13 to one end of a piece of jewelry.

According to the illustrated embodiment of the present invention, the openable link 13 is preferably provided with a clam-like design or motif, as best seen in FIG. 1A, which is particularly pleasing when the catch 11 is used to attach the ends of a string of pearls. It should be noted that precious stones or jewels (not shown) can be used to adorn the clam-like design of the ornamental catch 11.

Figure 2A:
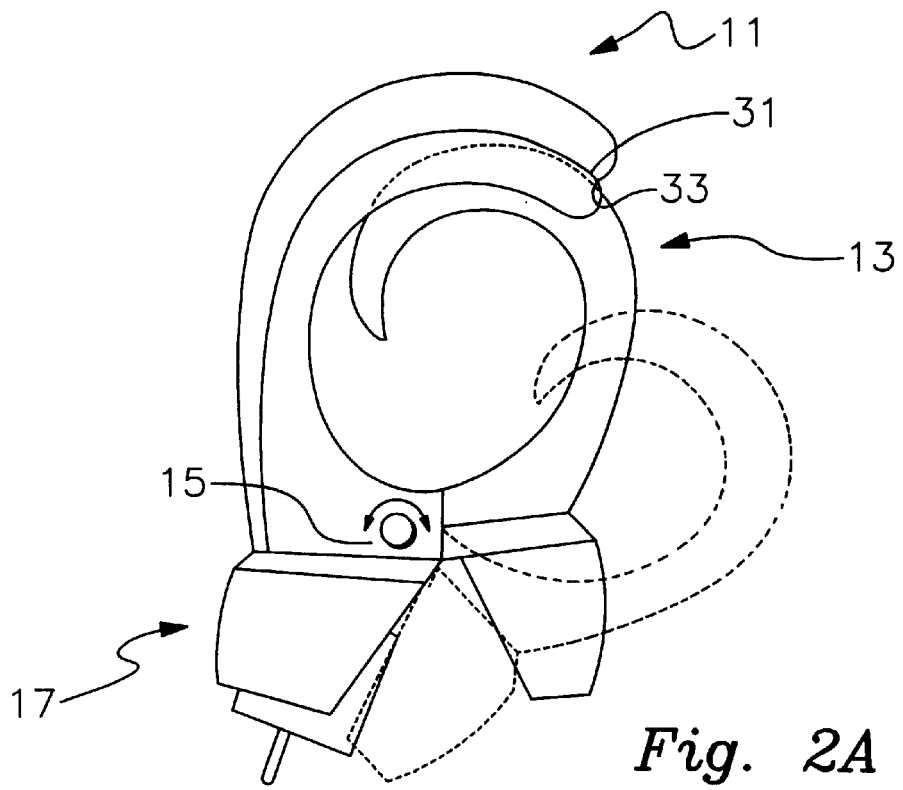
FIGS. 2A and 2B are a side, planar views of the ornamental jewelry catch shown respectively in the closed and opened positions.
Figure 2B:
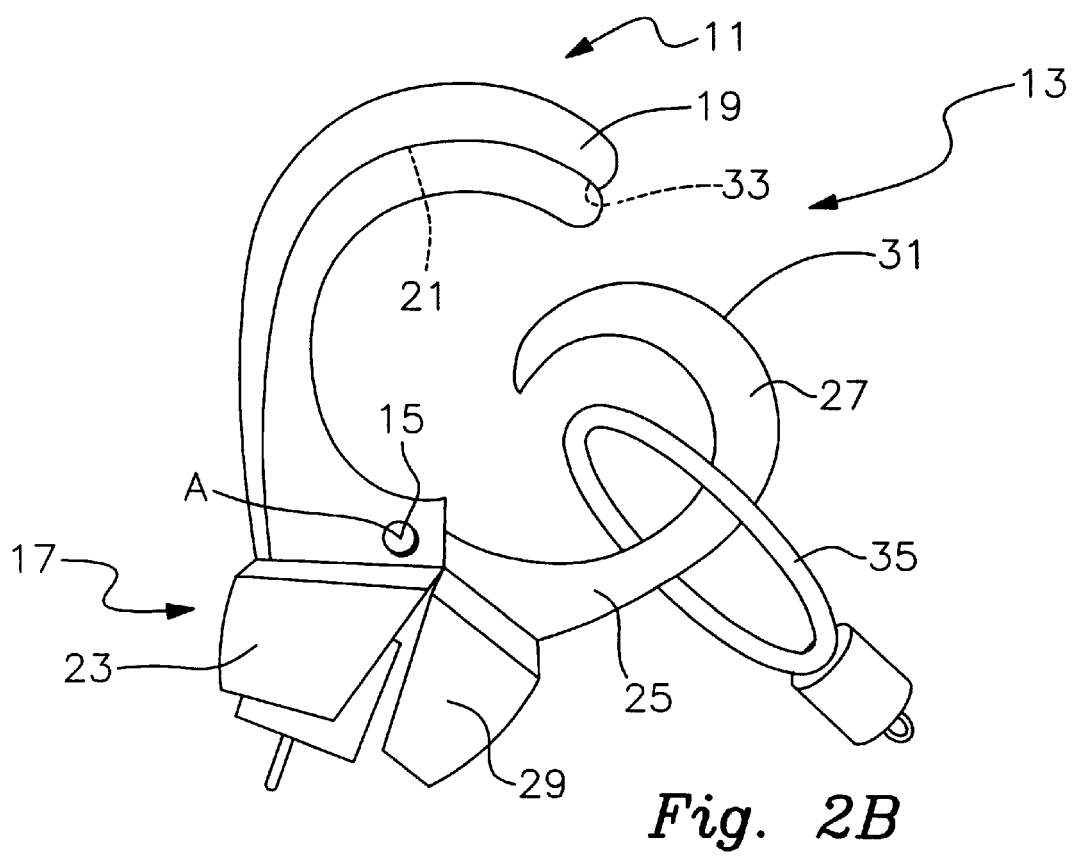

Referring to FIGS. 2A and 2B, the ornamental jewelry catch 11 is respectively shown in the closed and opened positions. As best seen in FIG. 2B, the openable link 13 comprises a first ornamental member or receptor shell 19 having an inner, curved receptacle 21 formed at one end portion thereof and finger press 23 at the other end. The openable link 13 further includes a second member or catch hook 25 having a hook 27 with a continuously curved, ball-like outer surface at one end thereof which is received by and releasably held in the curved receptacle 21 of the first member 19 in a snap-fit manner when the catch 11 is in the closed position, as seen in FIG. 2A, to form a closed loop. As a safety feature, as best seen in FIG. 2B, the hook 27, around which a solid jump ring 35 is placed, is preferably formed so the hook end is bent back toward itself to prevent snagging as well as to hold the solid jump ring 35 more securely in place. The second member 25 further includes a finger press 29 at its other end.

The hinge pin 15 is provided for pivotally connecting the first and second members 19, 25 so that the finger presses 23, 29 are juxtaposed to one another at one side of the pivot axis A and the curved receptacle 21 and hook 27 are juxtaposed to one another at the other side of the pivot axis A. In addition, the hinge pin 15 positions the forward most part or end 31 of hook 27 of the second member 25 slightly beyond or forward of the adjacent front opening 33 of the inner curved receptacle 21 of the first member 19 so that the hook 27 snaps into and out of engagement with the curved receptacle 21. Moreover, as best seen in FIG. 2A, the pivot axis A positions the forward end 31 relative to the front opening 33 so that the snap-fit configuration of hook 27 in receptacle 21 is constructed in such a manner to hold the openable link 13 in the closed position with sufficient force to prevent the inadvertent and unintended opening of the catch 11.

In this regard, it is important to note that since the first and second members 19, 25 are die cast from a metal material, such as, for example, platinum, yellow gold or white gold and the like, as well as, for example, alloys thereof, these components are made of dense metal so as to be substantially non-resilient and immune to the effects of repeated use and fatigue. In this regard, the first and second members 19, 25 are formed by either die cast, for example, using a die forming procedure or lost wax casting.

The catch 11 is opened by pressing the finger presses 23, 29 toward one another using the thumb and finger of a single hand so as to pivot the hook 27 out of snap-fit engagement with the receptacle 21 to open the link 13. The ends of the piece of jewelry, which are respectively attached to the base 17 and jump ring 35 as will be more fully described hereinafter, are connected together by hooking the jump ring 35 over the hook 27 and closing the link 13 by pressing hook 27 into snap-fit engagement with the receptacle 21 to close the link 13.

Figure 3:
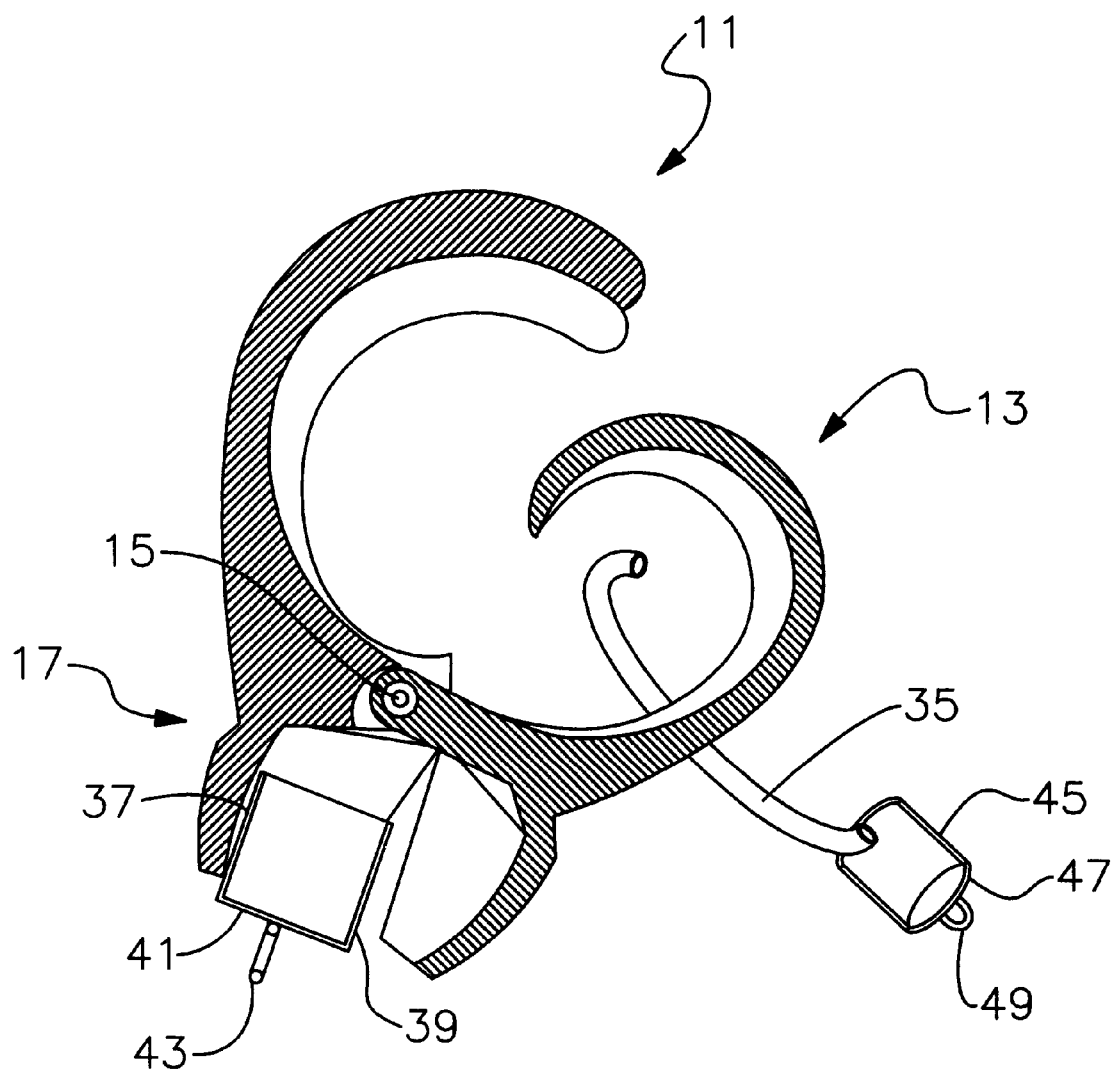
FIG. 3 is a side, section view of the ornamental jewelry catch of FIG. 1A taken along line 3—3.

Referring to FIG. 3, the base 17 of the openable link 13 is adapted for attachment to one end of a piece of jewelry by soldering, at 37, a hollow tube 39 having a solid end 41 to which is attached a small ring 43. The jump ring 35 is adapted for attachment to another end of a piece of jewelry by soldering thereto a hollow tube 45 having a solid end 37 to which is attached a small ring 49.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. An ornamental jewelry catch, having opened and closed positions, for removably connecting ends of a piece of jewelry, the ornamental catch comprising:
    (a) an openable link having a base for attachment to one end of the piece of jewelry, the link including:
        (1) a solid receptor shell made of high density metal, the solid receptor shell having a curved receptacle formed at one end thereof extending radially inward from a curved substantially non-resilient supporting portion and a finger press at another end thereof;
        (2) a solid catch hook made of a high density metal and having a hook with a continuously curved, ball-like outer surface at one end thereof which is received by and releasably held in the curved receptacle of the solid receptor shell in a snap-fit manner and a finger press at another end thereof;
        (3) a hinge pin for pivotally connecting the solid receptor shell and the solid catch hook at a pivot axis so that the finger presses of the solid receptor shell and the solid catch hook are juxtaposed to one another at one side of the pivot axis and the curved receptacle and hook are juxtaposed to one another at another side of the pivot axis, the hinge pin positioning a distal end of the hook slightly outside of a front opening of the curved receptacle to create a snap fit having sufficient force to hold the solid receptor shell and the solid catch hook together in the closed position; and (b) a ring for attachment to the other end of the piece of jewelry, the ring engaging the hook of the solid catch hook to attach the ends of the piece of jewelry together when the catch is in the closed position;

wherein the catch is opened by pressing the finger presses toward one another so as to snap the hook out the curved receptacle to open the link; and wherein the ornamental jewelry catch attaches the ends of the piece of jewelry by hooking the ring around the hook of the open link and pressing the hook into snap fit engagement with the curved receptacle to close the link.

2. An ornamental jewelry catch according to claim 1, wherein the high density metal comprises at least one of platinum, yellow gold or white gold.

3. An ornamental jewelry catch according to claim 2, wherein the solid receptor shell and the solid catch hook are formed by die casting.

4. An ornamental jewelry catch according to claim 1, wherein the solid catch hook is substantially non-resilient.

5. An ornamental jewelry catch according to claim 1, wherein the hook of the solid catch hook is bent back toward itself.

6. An ornamental jewelry catch according to claim 1, wherein the solid receptor shell and the solid catch hook are each provided with a connector for respectively attaching the solid receptor shell and the solid catch hook to respective ends of the piece of jewelry.

7. An ornamental jewelry catch according to claim 1, wherein the an outer surface of the solid receptor shell has a shape of a clam.

8. An ornamental jewelry catch according to claim 1, wherein the piece of jewelry is a string of pearls.

9. An ornamental jewelry catch, having opened and closed positions, for removably connecting ends of a piece of jewelry, the ornamental catch comprising:

(a) an openable link having a base for attachment to one end of the piece of jewelry, the openable link including:

(1) a solid ornamental member made of a high density metal for display when the piece of jewelry is worn, the solid ornamental member having a curved, inner receptacle portion at one end thereof extending radially inward from a curved substantially non-resilient supporting portion and a finger press at another end thereof;

(2) a solid catch hook made of a high density metal having a hooked portion with a continuously curved, ball-like outer surface at one end thereof which is received by and releasably held in the curved, receptacle portion of the solid ornamental member in a snap-fit manner when the catch is in the closed position to form a closed loop and a finger press at another end thereof;

(3) a hinge pin for pivotally connecting the solid ornamental member to the solid catch hook at a pivot axis positioned to form the base at one side thereof at which the finger presses are juxtaposed to one another and the hooked portion and curved receptacle portion are juxtaposed to one another at another side thereof, the hinge pin positioning a distal end of the hooked portion slightly outside of a front opening of the curved receptacle portion to create a snap fit having sufficient force to hold the solid ornamental member and the solid catch hook in the closed position; and (b) a jump ring for attachment to the other end of the piece of jewelry, the jump ring engaging the solid catch hook to attach the ends of the piece of jewelry together when the openable link is closed;

wherein the catch is opened by pressing the finger presses of the solid ornamental member and the solid catch hook toward one another so as to pivot the curved receptacle portion and hook portion away from and out of snap-fit engagement with one another to open the link; and wherein the ends of the piece of jewelry are connected together by opening the link and hooking the jump ring over the solid catch hook, then closing the catch by pressing the hook portion of the solid catch hook into snap-fit engagement with the curved receptacle portion of the solid ornamental member to close the link of the catch.

10. An ornamental jewelry catch according to claim 9, wherein the high density metal is at least one of platinum, yellow gold or white gold.

11. An ornamental jewelry catch according to claim 10, wherein the ornamental member and the catch hook are formed by die casting.

12. An ornamental jewelry catch according to claim 11, wherein the die casting is a die forming.

13. An ornamental jewelry catch according to claim 10, wherein the catch hook is substantially non-resilient.

14. An ornamental jewelry catch according to claim 10, wherein the hooked portion of the catch hook is bent back toward itself.

15. An ornamental jewelry catch according to claim 10, wherein the ornamental member and the catch hook are each provided with a connector for respectively attaching the first and second members to respective ends of the piece of jewelry.

16. An ornamental jewelry catch according to claim 10, wherein the ornamental member has a shape of a clam.

17. An ornamental jewelry catch according to claim 10, wherein the piece of jewelry is a string of pearls.

* * * * *